Nov. 1, 1938.   M. E. JOHNSON   2,135,211
PLUMB BOB
Filed Dec. 2, 1937
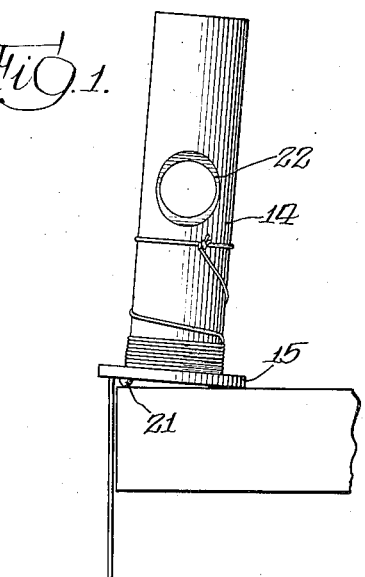
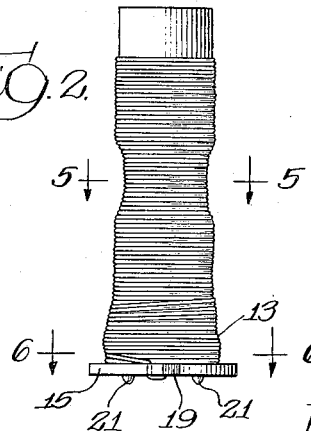
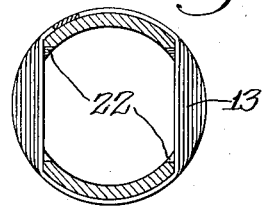
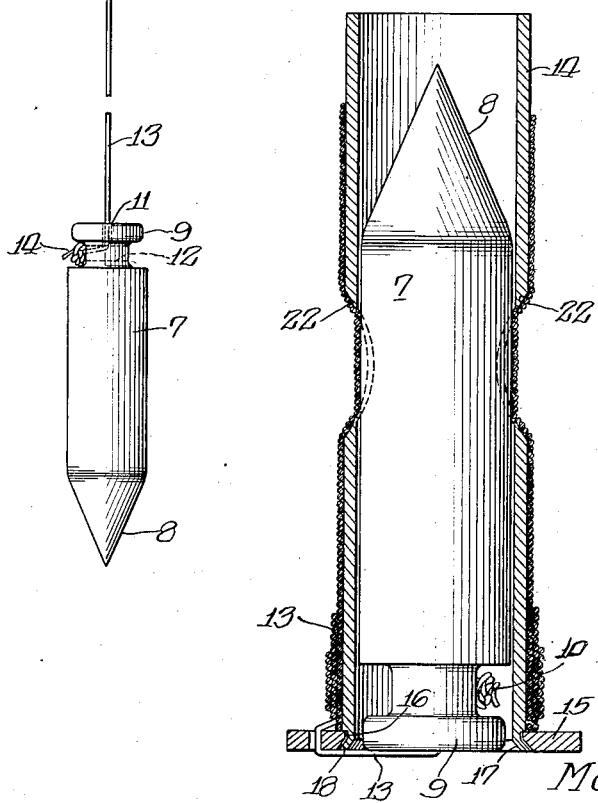
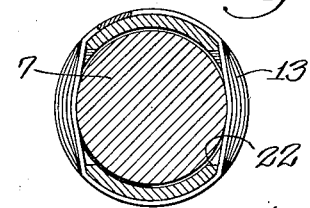
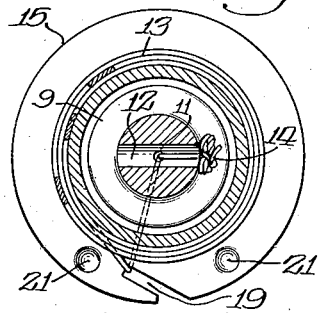
Inventor:
Martin E. Johnson,
By Ira J. Wilson Atty.

Patented Nov. 1, 1938

2,135,211

UNITED STATES PATENT OFFICE 2,135,211

PLUMB BOB

Martin E. Johnson, Chicago, Ill., assignor of one-half to Ira J. Wilson, Winnetka, Ill.

Application December 2, 1937, Serial No. 177,657

9 Claims. (Cl. 33—217)

This invention relates to plumb bobs of the general type employed by mechanics and artisans in building construction work and other places where the determination of a vertical is required.

One of the primary purposes of my invention is to provide a bob which can be carried in the pocket of the user without danger of snarling the line or losing any of the parts of the device.

Another object is to provide a combined bob and line reel which, when not in use, can be compacted so as to occupy a minimum of space, one from which the line can be readily unwound and upon which it can be readily rewound, and in the employment of which considerable time will be saved over that required in the handling of the bobs which are at present in common use.

To facilitate an understanding of my invention, I have illustrated on the accompanying drawing a preferred embodiment thereof from which, in connection with the following description, the principles of my invention and its inherent advantageous features should be readily appreciated.

Referring to the drawing:

Fig. 1 is a side elevation showing the position of the various parts when in use;

Fig. 2 is a side elevation showing the bob and reel in telescopic relation and with the line held against unwinding;

Fig. 3 is a vertical sectional view through the assembly of Fig. 2;

Fig. 4 is a transverse sectional view intermediate the ends of the reel with the bob proper removed;

Fig. 5 is a similar view on the line 5—5 of Fig. 2 showing the bob in telescoped position; and Fig. 6 is a sectional view on the line 6—6 of Fig. 2.

Referring to the drawing more in detail, the implement comprises a bob proper indicated generally by reference character 7, tapered at one end as indicated at 8, and provided at its upper end with a head 9 having a longitudinal central passage 11 communicating with a transverse passage 12 in the neck of the bob through which passage the plumb line 13 may be threaded and held against pulling through by a knot 10 tied in the end thereof.

When not in use, the line is wound around a reel consisting of a tubular member 14 upon one end of which a disk-shaped head or spool end 15 is rotatably mounted. This rotatable connection of the head to the tube may be accomplished by turning down one extreme end of the tube to a smaller external diameter so as to provide a shoulder 16 against which the head 15 rests and then spinning or peening the reduced end 17 outwardly to hold the head in place, the opening through the head being preferably inclined, as indicated at 18, for this purpose.

The head is provided with a slot 19, as shown, adapted to accommodate the line 13, and when the device is in use it is positioned in this slot which prevents further unwinding of the line from the reel. In order to overcome any tendency of the reel to upset as the result of the pull of the bob upon the head near its periphery, the head is provided on opposite sides of the slot with struck-down extensions 21 which serve as supporting feet for the reel, as indicated in Fig. 1.

The dimensions of the bob 7 are such that it fits loosely within the reel tube 14 into which it may be slipped when not in use. In order to frictionally hold the bob against slipping out of the tube, I have provided the tube with one or more openings 22 so that when the line 13 is wound on the tube it will in spanning said openings intersect the inner diameter of the tube, as exemplified in Fig. 4. When the bob is inserted into the tube, it will become frictionally engaged by the intersecting line or lines, as illustrated in Fig. 5, thereby frictionally holding the bob in position in the tube.

When the bob is inserted into the tube, some slack will be left in the line between the reel and the head of the bob, the length of this slack being at least equal to the length of the bob. After the bob has been inserted into the tube, the disk or head 15 with the slot 19 in which the line is resting, is then rotated relatively to the tube in a counter-clockwise direction viewing Fig. 6 until the slack in the line is taken up and wound upon the tube so as to maintain the line taut, as shown in Figs. 3 and 6, which will obviate its becoming caught or entangled with any object either without or within the pocket of the user.

In the embodiment of the invention shown, the tube 14 at the end opposite to the disk or head 15 is not equipped with a head. This leaves the end of the tube unobstructed to facilitate unwinding of the line from the tube over this end by simply permitting it to run off under the weight of the bob. This feature expedites the unwinding of the line and saves time in lowering the bob into position.

It will be apparent from the foregoing that I have provided a plumb bob which is very simple in construction and economical to manufacture, one which will when in use be steady on its support and reliable, and which when not in use can be telescoped so as to occupy a minimum of space and leave no projecting points or sharp edges or any loose or slack line. The rotatable slotted head enables the slack to be quickly taken up and holds the parts in telescoped position even if the friction of the intersecting line intermediate the tubes fails to hold the bob, because, obviously, the extent to which the bob may be withdrawn from the tube is limited by the short length of line between the base of the slot 19 and the center of the head 9.

While I have illustrated and described a preferred embodiment of my invention, it should be manifest that the structural details shown may be varied within considerable limits without departing from the scope of the invention which is defined in the following claims.

I claim:

1. A plumb bob comprising a tubular member adapted to serve as a reel for the line, a bob proportioned to telescope within said tube, and means mounted on the tube for rotation about an axis coincident with the longitudinal axis of the tube for taking up and holding the slack in the line between the bob and the tube.

2. A pumb bob comprising a tube adapted to have a pumb line wound upon the periphery thereof, a bob proportioned to telescope within said tube and having provisions for the attachment of the plumb line thereto, and a disk rotatably mounted upon one end of the tube and provided with a slot adapted to receive the line extending between the bob and the tube and whereby the slack in said line may be taken up.

3. A plumb bob comprising a tube, a bob adapted to be telescoped therein, a line connected to said bob and adapted to be wound upon said tube, and a disk rotatably mounted upon said tube and provided with a slot through which the line between said bob and tube extends.

4. A plumb bob comprising a tube unobstructed at one end and provided at its other end with a rotatable member having a slot extending inwardly from the periphery thereof, a bob proportioned to telescope within said tube, and a line attached to said bob and adapted to be wound upon said tube, that portion of the line extending between the tube and the bob being trained through said slot.

5. A plumb bob comprising a tube adapted to serve as a reel upon which a plumb line may be wound, said tube being provided between its ends with an opening permitting a line wound thereon to intersect the inner diameter of the tube, and a bob proportioned to telescope within said tube and to be frictionally engaged by said intersecting line whereby said bob is frictionally retained in position in said tube.

6. A plumb bob comprising a tube adapted to serve as a reel for a plumb line, said tube being provided with an opening across which a line wound thereon extends so as to intersect the inner perimeter of said tube, and a bob proportioned to telescope within said tube and be frictionally engaged by said intersecting line to retain said bob against displacement from said tube.

7. A plumb bob comprising a tube adapted to serve as a reel for a plumb line, a bob proportioned to telescope within said tube, a line wound upon said tube and attached at one end to said bob, said tube being provided with an opening through which the line wound on said tube may engage the bob to frictionally hold the bob against displacement from the tube.

8. A plumb bob comprising a tube adapted to serve as a reel for a plumb line wound thereon, a bob proportioned to telescope within said tube, and a disk rotatably mounted upon one end of said tube, said disk being provided with a slot to accommodate the line extending between the bob and the tube and with means in proximity to said slot for supporting said tube at an inclination to the vertical of a horizontal surface.

9. An article of manufacture comprising a tubular body adapted to have a line wound thereon, one end of said body being circumferentially unobstructed to permit unwinding of the line therefrom and the other end being provided with a disk or head rotatably mounted thereon and having a slot therein extending inwardly from the periphery and adapted to receive and frictionally hold that portion of the line extending from the body to thereby prevent unwinding of the line from the body.

MARTIN E. JOHNSON.